Figure 1:
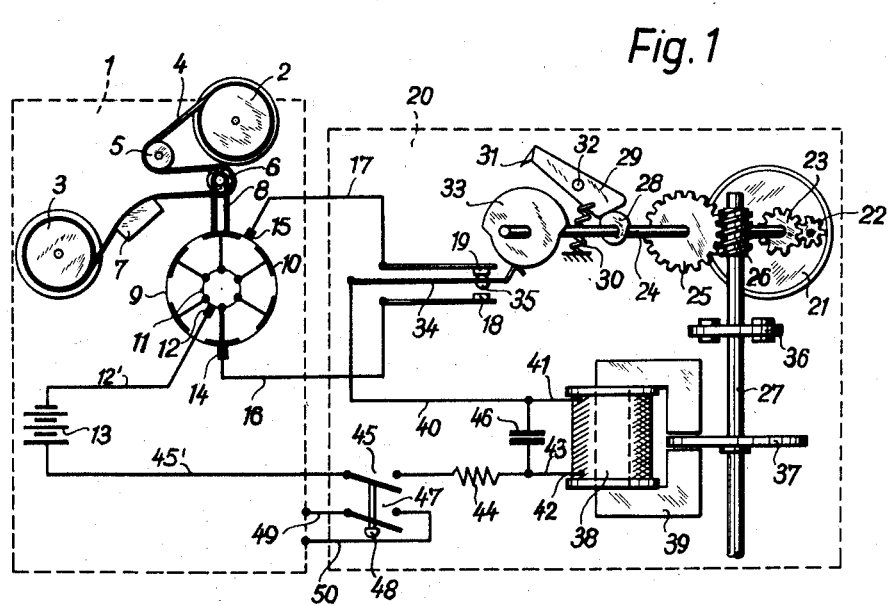

April 5, 1960     H. REINSCH     2,931,949
SPEED REGULATING ARRANGEMENT

Filed Jan. 2, 1957

INVENTOR
Herbert Reinsch
by Michall S. Striker
Agent

United States Patent Office 2,931,949
Patented Apr. 5, 1960

2,931,949

SPEED REGULATING ARRANGEMENT

Herbert Reinsch, Stuttgart, Germany, assignor to Eugen Bauer G.m.b.H., Stuttgart-Unterturkheim, Germany Application January 2, 1957, Serial No. 632,102

Claims priority, application Germany January 4, 1956

10 Claims. (Cl. 317—6)

The present invention relates to a speed regulating arrangement. More particularly, the present invention relates to an arrangement for maintaining a predetermined relationship between the rotational speeds of rotary members.

There are many movie cameras and projectors in use today which have no provision for producing synchronized sound during the taking of the motion picture film or the projection thereof. There have been attempts made to synchronize the taking and projecting of the motion picture film with sound recorded and reproduced on tape recorders or the like. In my copending United States patent applications Serial Nos. 579,819 and 620,545, I have described arrangements for synchronizing the reproduction of sounds recorded on magnetic tape recorders with the film transport rate of film being projected by projectors.

In the above-described arrangements, both the magnetic tape recorder and the projector for the film are energized by motors which are connected to the usual electrical power supplies. However, when a camera is being used for taking the motion pictures, quite often the camera is powered by a spring-wound motor. In such an arrangement, the speed of the spring-wound motor is usually higher when the spring is fully wound so that the speed of the motor decreases when the spring becomes less fully wound.

That is, with a spring-wound motor the speed of the film in frames per second substantially continually decreases as the tension of the spring is released.

Furthermore, in conventional arrangements wherein impulses produced in the camera are transmitted to the sound recording device for synchronization purposes, such impulses must be reproduced when the motion picture is being projected. Since the speed of the spring-wound motor of the camera is substantially continually changing, it would be necessary with the impulse producing system to continuously decrease the speed of the projector when the film is being reproduced synchronously with the sound. Also, the stability of such a regulation system is adversely affected.

In arrangements wherein the impulse transmitting system is used, it is necessary to have a separate amplifier for amplifying the impulses to properly synchronize the sound and movie reproduction devices.

It is accordingly an object of the present invention to overcome the above-described disadvantages of conventional devices.

It is a second object of the present invention to provide a new and improved speed regulating arrangement.

A further object of the present invention is to provide a new and improved synchronizing arrangement for synchronizing the recording of sound with the taking of motion picture by means of a spring energized motion picture camera.

It is still a further object of the present invention to provide a speed regulating apparatus for regulating the speed of two independent rotary members wherein the speed regulation is controlled by the difference in speed between the rotary members.

With the above objects in view, the present invention mainly consists of apparatus for maintaining a predetermined relationship between the rotational speeds of independent rotary members and including means for rotating the rotary members, speed changing means operatively associated with at least one of the rotary members for changing the speed of the same in accordance with the energization of the speed changing means, and means for energizing the speed changing means in accordance with the rotational speed of at least another of the rotary members for maintaining the desired predetermined relationship between the rotational speeds of the rotary members.

In a preferred embodiment of the present invention, the speed changing means includes electrical brake means which cooperates with a shaft coupled to the driving shaft of the camera.

In another preferred embodiment, the speed of the spring-wound camera is adjusted to be higher than the normal speed of the magnetic tape in the magnetic tape recorder. An eddy current braking device is used to decrease the speed of the driving shaft in the camera. The regulation of the eddy current braking arrangement is controlled by switching means which are associated with the tape recorder shaft and the driving shaft of the camera.

Figure 2:
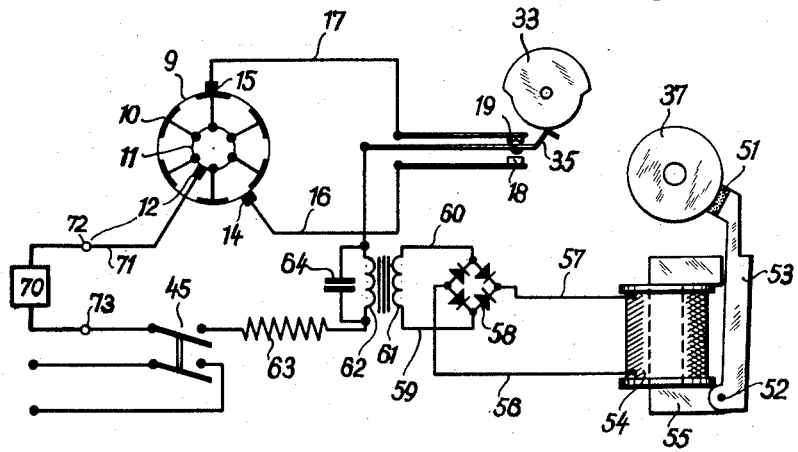

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an electrical schematic diagram of an embodiment incorporating the principles of the present invention; and Fig. 2 is an electrical schematic diagram, partly diagrammatic in form of a second embodiment of the present invention.

Referring to the drawings and more particularly to Fig. 1 it can be seen that a tape recorder 1 is provided with a take-up reel 2 and a supply reel 3 for the magnetic tape 4. The magnetic tape 4 is transported between the take-up and supply reels by means of a driving roller 5.

Arranged along the path of the magnetic tape 4 is a recording head 7 and an idler roller 6. The idler roller 6 is rotated at a rotational speed depending upon the linear speed of the magnetic tape imparted to it by the driving roller 5.

The idler roller 6 is mounted on a rotatable shaft 8 having also mounted thereon an electrically insulating disc 9. The disc 9 rotates with the shaft 8 and has arranged on the outer annular periphery thereof a plurality of spaced electrically conductive segments 10. Near the center portion of the disc 9 is arranged a slip ring 11 which is electrically conductive and makes electrical connection with each of the electrically conductive segments 10 on the periphery of the disc 9.

Making electrical sliding contact with the slip ring 11 is a brush 12 which is connected by means of a conductor 12' to one pole of a direct current source 13. Making contact with the outer periphery of the disc 9 are electrical brushes 14 and 15. It can be seen that the angular displacement between the brushes 14 and 15 is such that the brush 14 makes contact with one of the electrically conductive segments 10 when the brush 15 is arranged on an insulating portion of the disc 9.

The brush 14 is connected by a conductor 16 to one fixed contact 18 of a switch having a second fixed contact 19 and a movable armature 35 arranged between the fixed contacts 18 and 19. The fixed contact 19 is connected by a conductor 17 to the other brush 15.

In the camera 20, a spring-wound motor 21 is provided for driving by means of gears 22 and 23, a drive shaft 24 on which is mounted a cam 28. As the drive shaft 24 is rotated by the spring-wound motor 21, the cam 28 pivots a claw 29 about a pivot point 32 against the action of a restoring spring 30.

The free end portion of the claw 29 is provided with a pointed portion 31 which is adapted to communicate with the perforations in the movie film. That is, the drive shaft 24 by pivoting the claw 29 is able to move the motion picture film of the camera past the shutter opening thereof in response to the motor 21.

At the end of the drive shaft 24 a second cam 33 is mounted which has a cam track on the periphery thereof making contact with the movable contact 35. As illustrated, approximately 180° of the periphery of the cam 33 has a larger diameter portion and the remaining half of the cam has a smaller diameter portion.

In the illustrated position, the smaller diameter portion of the cam 33 makes contact with the movable contact 35 thereby permitting the contact 35 to be urged against the fixed contact 19 and to make electrical contact therewith. The movable contact 35 is normally biased against the fixed contact 19 by spring means not otherwise illustrated.

When the shaft 24 is rotated so that the larger diameter portion of the cam 33 engages the movable contact 35, the contact 35 is moved out of contact with the fixed contact 19 into engagement with the fixed contact 18. It can therefore be seen that if the larger diameter portion extends for substantially 180° of the cam track, that the movable contact 35 will make contact with the fixed contact 18 for one-half a revolution of the drive shaft 24 and will make contact with the fixed contact 19 for the other half of the revolution of the drive shaft 24.

Also mounted on the drive shaft 24 is a gear 25 which is meshed with a gear 26 that is fixedly mounted on a shaft 27 to cause the shaft 27 to rotate at a rotational speed proportional to the rotational speed of the gears 25 and 26. Mounted on the shaft 27 which is the regulating shaft of the camera is a regulator 36 and a disc 37 made of an electrically conductive material. The faces of the disc 37 pass between the poles of an electromagnetic core 39 having a magnetic winding 38 mounted about one leg thereof.

One end 41 of the coil 38 is connected by means of a conductor 40 and a conductor 34 to the movable contact 35. The other end 42 of the coil 38 is connected by means of a conductor 43 and through a resistor 44 to a normally open contact of a switch 45. The other side of the switch 45 is connected by means of conductor 45' to the other pole of the direct current source 13. It can be seen that a capacitor 46 is connected across the ends 41 and 42 of the magnetic winding 38.

Mechanically coupled to the switch 45 is a switch 47 which has its movable contact arranged on a push-button rod 48. One side of the switch 47 is connected on a conductor 49 to the magnetic tape recorder 1 and the other side of the switch 47 is connected by means of a conductor 50 to the magnetic tape recorder 1. That is, the switch 47 operates to close the energizing circuit for the energizing motor (not shown) of the magnetic tape recorder.

In operation, the push-button 48 is operated to close the switches 45 and 47, and also the motor 21 is started. Simultaneously, this releases the driving mechanism of the camera 20. Therefore, the magnetic tape recorder and the camera 20 are simultaneously energized. The driving roller 5 of the tape recorder 1 transports the tape between the take-up reel 2 and the supply reel 3 at a transport speed depending upon the particular tape recorder. Accordingly any sounds which are to be synchronized with the film in the camera can be recorded on the magnetic tape by means of the recording head 7.

The movement of the magnetic tape 4 rotates the idler roller 6, rotating therewith the shaft 8 and the disc 9 at a rate proportional to the transport rate of the magnetic tape 4.

The rotational speeds of the camera and the magnetic tape recorder are arranged so that the cam 33 arranged on the drive shaft 24 makes several revolutions for each revolution of the disc 9. Also, the initial speed of the drive shaft 24 driven directly by the motor 21 is a speed which is higher than the desired synchronization speed. For example, if it is desired to take the motion pictures at a film speed of 16 frames per second, the constants of the spring-wound motor will be arranged so that at the fully wound position, the shaft 24 will be rotated with a rotational speed equivalent to 18 frames per second.

In the position illustrated in Fig. 1, the electrical brake made up of the magnetic winding 38, the magnetic core 39 and the disc 37 is in an unenergized condition. That is, the magnetic winding 38 is to be energized by the direct current source 13, but since the brush 15 is making contact, in the illustrated position, with the insulating portion of the periphery of the disc 9 the first switching means which is mounted on the shaft 8 is in circuit opening position. Similarly, while the brush 14 is making contact with the electrically conductive segments on the periphery of the disc 9, the conductor 16 connected thereto is connected to the open contact of the second switching means which cooperates with the cam 33 mounted on the drive shaft 24. Therefore both of the energizing circuits for the magnetic winding 38 are open in the illustrated position.

Since there are six electrically conductive segments 10 on the periphery of the disc 9, if the cam 33 runs at a speed which is six times as fast as the rotational speed of the disc 9, it is possible for the magnetic winding 38 to be connected to its energizing source 13 at all times or to be disconnected therefrom at all times, provided the cam 33 makes one revolution each time that one of the brushes 14 or 15 is moving from a conductor segment to an insulating segment.

On the other hand, under the same condition, if when the fixed contact 14 or 15 is entering into contact with the electrically conductive segment 10, its respective contact 18 or 19 is being closed at the same instant, it is seen that the magnetic winding 38 will be held connected to the energizing source 13.

These are the two limiting conditions. That is depending upon the phase relation between the action of cam 33 and that of the disc 9, either the electrical brake may always be deenergized or may be always energized. When the magnetic winding 38 is connected to the direct current source 13, an energizing current flows therethrough producing a magnetic flux across the air gap of the core 39. The interaction of this magnetic flux with the rotating electrically conductive disc 37 produces eddy currents which tend to brake the disc 37 thereby slowing down the rotational speed of the shaft 27. Since this shaft is directly coupled by means of the gears 26 and 25 to the drive shaft 24, it is clear that this will also slow down the shaft 24 and consequently slow down the movement of the film through the camera.

In practice, while the rotational speeds of shafts 24 and 8 vary, the magnetic winding is energized for certain periods of time and is deenergized for other periods of time, depending on the precise phase relationship between the cam track portions of the cam 33 and the electrically conductive segments 10 of the disc 9. Accordingly, since the spring-wound motor 21 is originally set to drive the shaft 24 at a faster than desired rotational speed, the cooperation of the switching means consisting of the fixed contacts 12, 14 and 15 and the rotational disc 9 and the cooperation of the cam 33 with the movable contact 35 will energize or deenergize the magnetic winding 38 through spaced time intervals so as to maintain a predetermined relationship between the speed of rotation of the shaft 24 and the speed of rotation of the shaft 8 at the magnetic tape recorder. As pointed out hereinabove since the drive shaft 24 normally runs faster than the shaft 8, it is possible to achieve such a predetermined relationship merely by braking only the drive shaft 24. When the shaft 24 is braked while shaft 24 rotates faster than at synchronization speed, the periods of closed circuit condition increase causing greater energization of the magnetic winding 38 and consequently greater braking action, and when the rotational speed of the shaft 24 drops below the desired speed relationship, the effect of the slower speed on the cam 33 will be to cause the periods of energizing time for the magnetic winding 38 to grow shorter whereby the braking effect is reduced and the shaft 24 permitted to pick up speed.

The capacitor 46 and the resistor 44 serve to damp the oscillation of the current supplied to the magnetic winding 38 and to regulate the operation of the apparatus.

Referring now to Fig. 2, the operation of a second embodiment of the present invention will be described. In Fig. 2, the parts which have the same function as in the embodiment described in Fig. 1 have the same numerals.

As can be seen in Fig. 2, in place of the magnetic winding 38, a magnetic winding 54 is provided which cooperates with a core 55, at one end 52 of which is pivotally mounted an armature 53 having a brake shoe 51 at the free end portion thereof.

The armature 53 is adapted to be attracted towards the core 55 upon energization of the magnetic winding 54 thereby bringing the brake shoe 51 into contact with the periphery of the disc 37.

One end of the magnetic winding 54 is connected by means of a conductor 56 to one output terminal of a full wave rectifier 58, the other output terminal of which is connected by a conductor 57 to the other end of the magnetic winding 54. One input terminal of the rectifier 58 is connected by means of a conductor 59 to one end of the secondary winding 61 of a transformer. The other end of the secondary winding 61 is connected by means of a conductor 60 to the other input terminal of the rectifier 58.

The transformer also has a primary winding 62 one end of which is connected through a resistor 63 to one side of the switch 45 while the other side of the primary winding 62 is connected to the movable contact 35 which cooperates with the cam 33. Connected across the primary winding 62 is a capacitor 64.

The cam and switch means having the same numerals are connected in the same manner as indicated in Fig. 1. However, the brush 12 is connected by means of a conductor 71 to one terminal 72 of an alternating current source 70. The other terminal 73 of the source 70 is connected to the other side of the switch 45. Actually the alternating current source 70 may be the ordinary house current supply which is normally used to energize the magnetic tape recorder. In operation, the switching members consisting of the disc 9 and the contacts 12, 14 and 15 and the cam 33 with the contacts 18, 35 and 19 operate in the same manner as indicated with respect to Fig. 1. However, in Fig. 2 instead of the direct current source 13, the alternating current source 70 is used. Therefore instead of the energizing current flowing directly from the direct current source through the magnetic winding, in the embodiment of Fig. 2, the energizing current which is an alternating current flows through the primary winding 62 of the transformer thereby inducing a proportional voltage in the secondary winding 61 of the transformer. This voltage is rectified by the rectifier 58 and applied to the magnetic winding 54 from the output terminals of the rectifier.

When the rectified current flows through the magnetic winding 54, the armature 53 is attracted towards the core 55 about its pivot point 52 so that the brake shoe 51 is moved into contact with the periphery of the disc 37 to brake the rotational speed of the disc 37 and thereby reduce the speed of the drive shaft 24. The switching arrangement cooperates in the same manner as indicated in Fig. 1 so that the speed of the film in the camera is regulated with a very fine control to precisely the desired synchronous speed with which sound is being recorded on the magnetic tape 4 in the tape recorder.

It is clear that the discs 33 and 37 can be arranged on different shafts of the camera instead of direct on the respective shafts 24 and 27. For example, the discs can be directly connected to the spring-wound motor 21. Similarly the form of the cam 33 can be altered so that the movable contact 35 need not be moved back and forth twice per revolution but some other desired phase relationship can be provided. It is also clear that a different number of electrically conducted segments 10 can be arranged on the periphery of the disc 9 so as to provide other advantageous phase relationships between the disc 9 and the cam 33.

It will be understood that each of the elements described above, or two or more together, may also find a useful application in other types of speed regulating arrangement differing from the types described above.

While the invention has been illustrated and described as embodied in arrangement for synchronizing the speed of film in a camera to a sound recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for maintaining a predetermined relationship between the rotational speeds of independent rotary members, comprising in combination, means for rotating said rotary members; electrical brake means operatively associated with at least one of said rotary members for decreasing the speed of said one rotary member in accordance with the energization of the electrical brake means; alternating current energizing means connected in circuit with said electrical brake for energizing the same; a transformer having a primary winding connected in circuit with said energizing means and a secondary winding connected in circuit with said electrical brake; first switching means connected in circuit between said primary winding and said alternating current energizing means and being movable by one of the rotary members between a circuit opening and a circuit closing position at a rate dependent upon the rotational speed of said rotary member; second switching means connected in circuit between said primary winding and said alternating current energizing means and in series with said first switching means and being movable between circuit opening and circuit closing position by a second of the rotary members at a rate proportional to the rotational speed of said second of said rotary members, said electrical brake being energized when said first and second switching means are simultaneously in circuit closing position and being deenergized when either of said switching means is in said circuit opening position to thereby maintain the desired predetermined relationship between the rotational speeds of the rotary members.

2. Apparatus as claimed in claim 1 wherein one of the rotary members is as associated with a recording device and is a rotating shaft and at least one of the switch-means includes a disc-shaped member fixedly mounted on said rotating shaft and rotatable therewith, said disc-shaped member being made of an electrically insulated material and having a plurality of spaced electrical conducting segments mounted on the periphery thereof, said switching means further including two fixed contacts making sliding contacts with the periphery of said disc-shaped member and a third fixed contact, said switching means having a slip ring member of smaller diameter than said disc-shaped member and mounted on said disc-shaped member making sliding electrical contact with said third fixed contact, said slip ring member being electrically connected to the electrically conductive segments arranged on the periphery of said disc-shaped member; and wherein the other rotary member is a shaft driven by a motion picture camera.

3. Apparatus as claimed in claim 1 wherein said fixed contacts making sliding contact with the periphery of said disc-shaped member are arranged with respect to each other so that one of said fixed contacts makes electrical contact with one of said electrically conductive segments when the other fixed contact makes contact with an electrically insulating poriton of the periphery of said disc-shaped member.

4. Apparatus for synchronizing the speed of a motion picture camera with the speed of a recording device and comprising, in combination, a first rotary member rotating at the speed of the motion picture camera and associated with the same; a second rotary member associated with the recording device and rotating at the speed of the recording device; brake means connected to said first rotary member, said brake means having a winding and being actuated to reduce the speed of said first rotary member when said winding is energized; energizing means connected in circuit with said winding of said brake means; and a plurality of switch means directly connected into the circuit between said winding and said energizing means, at least one of said switch means being operatively connected to said first rotary member and being moved by the same between circuit closing and circuit opening positions, at least another of said switch means being operatively connected to said second rotary member and being operated by the same between circuit opening and circuit closing positions, said one switch means and said other switch means being connected in series in the circuit of said winding so that said winding of said brake is energized to reduce the speed of said first rotary member when both said switch means are simultaneously in circuit closing position and so that said winding is deenergized when any one of said switch means is in circuit opening position whereby the desired synchronism between the rotary speeds of said rotary members is obtained.

5. Apparatus for synchronizing the speed of a motion picture camera with the speed of a recording device and comprising, in combination, a first rotary member rotating at the speed of the motion picture camera and associated with the same; a second rotary member associated with the recording device and rotating at the speed of the recording device; brake means connected to said first rotary member, said brake means having a winding and being actuated to reduce the speed of said first rotary member when said winding is energized; energizing means connected in circuit with said winding of said brake means; a first switch means including a movable contact and a pair of stationary contacts, said movable contact being connected to one end of said winding; a cam means driven from said first rotary member for operating said movable contact to alternately make contact with said stationary contacts; a rotary switch means having a plurality of contact segments arranged in a circle and being driven from the second rotary member; a pair of brushes in sliding contact with said contact segments, one of said brushes engaging one of said contact segments and the other of said brushes being located between two contact segments at any time during rotation of said switch means, said brushes being respectively connected to said stationary contacts; and connecting means connected to all said contact segments and to the energizing means, said cam means and said rotary switch means being so designed and constructed that at a certain relation between the speeds of said first and second rotary member, the circuit of said winding is interrupted, and in another relation of the speeds of said first and second rotary members, the circuit of said winding is connected to the energizing means whereby the desired synchronism between the rotary speeds of said rotary members is obtained.

6. An apparatus as set forth in claim 5 wherein said energizing means is a source of direct current.

7. An apparatus as set forth in claim 5 wherein said energizing means is a source of alternating current, and including rectifier means connected into the circuit of said winding.

8. An apparatus as set forth in claim 5 wherein said cam means is rotary and has two track portions of different diameter extending each through 180°; wherein there are $n$ contact segments on said rotary switch means; and wherein the rotary speed of said cam means is $n$ times the rotary speed of said rotary switch means.

9. Apparatus for synchronizing the speed of a motion picture camera with the speed of a recording device employing tape and comprising, in combination, a first rotary member rotating at the speed of the motion picture camera and driven from the drive shaft of the same; a second rotary member associated with the recording device and rotating at the speed of the recording device, said second rotary member being adapted to be driven by the tape passing through the recording device; brake means connected to said first rotary member, said brake means having a winding and being actuated to reduce the speed of said first rotary member when said winding is energized; energizing means connected in circuit with said winding of said brake means; and a plurality of switch means directly connected into the circuit between said winding and said energizing means, at least one of said switch means being operatively connected to said first rotary member and being moved by the same between circuit closing and circuit opening positions, at least another of said switch means being operatively connected to said second rotary member and being operated by the same between circuit opening and circuit closing positions, said one switch means and said other switch means being connected in series in the circuit of said winding so that said winding of said brake is energized to reduce the speed of said first rotary member when both said switch means are simultaneously in circuit closing position and so that said winding is deenergized when any one of said switch means is in circuit opening position whereby the desired synchronism between the rotary speeds of said rotary members is obtained.

10. Apparatus for synchronizing the speed of a motion picture camera with the speed of a recording device and comprising, in combination, a first rotary member rotating at the speed of the motion picture camera and associated with the same; a second rotary member associated with the recording device and rotating at the speed of the recording device; brake means connected to said first rotary member, said brake means having a winding and being actuated to reduce the speed of said first rotary member when said winding is energized; energizing means connected in circuit with said winding of said brake means; a first switch means including a movable contact and a pair of stationary contacts, said movable contact being connected to one end of said winding; a cam means driven from said first rotary member for operating said movable contact to alternately make contact with said stationary contacts; a rotary switch means having a plurality of contact segments arranged in a circle and being driven from the second rotary member; a pair of brushes in sliding contact with said contact segments, one of said brushes engaging one of said contact segments and the other of said brushes being located between two contact segments at any time during rotation of said switch means, said brushes being respectively connected to said stationary contacts; slide ring means connected to all said contact segments; and a brush sliding on said slide ring means and connected to the energizing means, said cam means and said rotary switch means being so designed and constructed that at a certain relation between the speeds of said first and second rotary member, the circuit of said winding is interrupted, and in another relation of the speeds of said first and second rotary members, the circuit of said winding is connected to the energizing means whereby the desired synchronism between the rotary speeds of said rotary members is obtained.

References Cited in the file of this patent

UNITED STATES PATENTS

| | | |
|---|---|---|
| 1,350,214 | Eisenmann | Aug. 17, 1920 |
| 1,356,226 | Severy | Oct. 19, 1920 |
| 2,394,361 | Bruderlin | Feb. 5, 1946 |

FOREIGN PATENTS

| | | |
|---|---|---|
| 365,117 | Great Britain | July 11, 1930 |
| 505,655 | Great Britain | May 15, 1939 |